(12) United States Patent
Chuang et al.

(10) Patent No.: US 9,362,763 B2
(45) Date of Patent: Jun. 7, 2016

(54) WIRELESS CHARGING CIRCUIT AND ABNORMAL STATE PROTECTION CIRCUIT THEREOF

(71) Applicant: Generalplus Technology Inc., Hsinchu (TW)

(72) Inventors: Down XU Chuang, Miaoli County (TW); Deying Zhang, Shandong (CN)

(73) Assignee: GENERALPLUS TECHNOLOGY INC., Hsinchu (TW)

( * ) Notice: Subject to any disclaimer, the term of this patent is extended or adjusted under 35 U.S.C. 154(b) by 180 days.

(21) Appl. No.: 14/322,111

(22) Filed: Jul. 2, 2014

(65) Prior Publication Data

US 2015/0061604 A1    Mar. 5, 2015

(30) Foreign Application Priority Data

Aug. 30, 2013    (TW) .............................. 102131323 A

(51) Int. Cl.
*H02J 7/00*    (2006.01)
*H02J 7/04*    (2006.01)
*H02J 7/02*    (2016.01)

(52) U.S. Cl.
CPC ............ *H02J 7/0036* (2013.01); *H02J 7/0047* (2013.01); *H02J 7/0068* (2013.01); *H02J 7/025* (2013.01)

(58) Field of Classification Search
CPC ....... H02J 7/025; H02J 7/0036; H02J 7/0047; H02J 7/007

USPC .......................................... 320/137, 145, 108
See application file for complete search history.

(56) References Cited

U.S. PATENT DOCUMENTS

| | | | | |
|---|---|---|---|---|
| 2008/0211455 | A1* | 9/2008 | Park .................. | H02J 7/025 320/108 |
| 2013/0093388 | A1* | 4/2013 | Partovi ............... | H01F 5/003 320/108 |
| 2013/0271069 | A1* | 10/2013 | Partovi ............... | H02J 7/025 320/108 |
| 2014/0132210 | A1* | 5/2014 | Partovi ............... | H02J 5/005 320/108 |

* cited by examiner

*Primary Examiner* — M'Baye Diao
(74) *Attorney, Agent, or Firm* — Muncy, Geissler, Olds & Lowe, P.C.

(57) ABSTRACT

A wireless charging circuit and an abnormal state protection circuit thereof is provided in the present invention. The wireless charging circuit includes a power converter, a resonant circuit and an abnormal state protection circuit. The power converter receives an input voltage for outputting a PWM (pulse width modulation) signal. The input terminal of the resonant circuit receives the PWM signal. The common voltage terminal of the resonant circuit is coupled to a common voltage. The abnormal state protection circuit includes a DC sampling circuit and a control circuit. The DC sampling circuit is coupled to the resonant terminal of the resonant circuit for sampling the DC component of the voltage of the resonant terminal to obtain a DC voltage. The control circuit is coupled to the power converter and the DC sampling circuit for receiving the DC voltage. When the DC voltage is greater than a threshold voltage, the control circuit controls the power converter to reduce the current flowing through the resonant circuit.

18 Claims, 6 Drawing Sheets

US 9,362,763 B2

WIRELESS CHARGING CIRCUIT AND ABNORMAL STATE PROTECTION CIRCUIT THEREOF

This application claims priority of No. 102131323 filed in Taiwan R.O.C. on Aug. 30, 2013 under 35 USC 119, the entire content of which is hereby incorporated by reference.

BACKGROUND OF THE INVENTION

1. Field of Invention

The present invention relates to the wireless power transmission and feedback technology, and more particularly to a wireless charging circuit and an abnormal state protection circuit thereof.

2. Related Art

Wireless charging technology is a technology for charging device by electromagnetic field without any wire. Wireless charging technology is evolved from the wireless power transmission technology to use the magnetic resonant to transmit the electrical charge from charger to device to resonate coil and capacitor between the charge and device to achieve a high efficient power transmission. The wireless charger is more safer, no exposed connections, no leakage current. Thus, a lot of problems in wired charger is prevented.

Due to the development of the wireless charging technology, Wireless Power Consortium is established because of the situation. One of accomplishments of Wireless Power Consortium is to promote Qi standard. With the standardization, wireless charging technology is more widely adopted. In Qi standard, when transmitter charges the receiver, the transmitter must decode the signal carried by the transmitted power at LC harmonic oscillator to be used for controlling the transmitting power and procedure. Therefore, the correctness of the signal transmission is pretty important.

However, when the placement of the coil of the wireless charging receiver and the position of the coil of the wireless power transmitter is not matched or there is a conductor between the coil of the wireless charging receiver and the coil of the wireless power transmitter, the wireless power receiver would continuously send a request to the wireless power transmitter to ask the wireless power transmitter to increase the output power. When the wireless power transmitter continuously operates at the resonant frequency, the current flowing through the coil of the wireless power transmitter would be continuously increased, and the temperature thereof is thus increased. Therefore, the plastic case of the wireless power transmitter may be melted. Furthermore, a fire may break out.

SUMMARY OF THE INVENTION

It is therefore an objective of the present invention to provide a wireless charging circuit and an abnormal state protection circuit to determine the output current and output power according to a voltage detected from the resonant circuit, so that the damage of the wireless charging circuit is avoided.

To achieve the above-identified or other objectives, the present invention provides wireless charging circuit. The wireless charging circuit includes a power converter, a resonant circuit and an abnormal state protection circuit. The power converter receives an input voltage, for outputting a pulse width modulation signal. The resonant circuit includes an input terminal, a resonant terminal and a common voltage terminal, wherein the input terminal of the resonant circuit receives the pulse width modulation signal, and the common voltage terminal of the resonant circuit is coupled to a common voltage. The abnormal state protection circuit includes a DC sampling circuit and a control circuit. The DC sampling circuit is coupled to the resonant terminal of the resonant circuit, for sampling the DC component of a voltage of the resonant terminal of the resonant circuit to obtain a DC voltage. The control circuit is coupled to the power converter and the DC sampling circuit, receiving the DC voltage. When the DC voltage is greater than a threshold voltage, the control circuit controls the power converter to reduce a current inputted to the resonant circuit.

In the wireless charging circuit and the abnormal state protection circuit according to the preferred embodiment of the present invention, the resonant circuit includes a resonant coil and a resonant capacitor. The resonant coil includes a first terminal and a second terminal, wherein the first terminal of the resonant coil is coupled to the input terminal of the resonant circuit. The resonant capacitor includes a first terminal and a second terminal, wherein the first terminal of the resonant capacitor is coupled to the second terminal of the resonant coil and the resonant terminal of the resonant circuit, and the second terminal of the resonant capacitor is coupled to the common voltage terminal of the resonant circuit.

In the wireless charging circuit and the abnormal state protection circuit according to the preferred embodiment of the present invention, the DC sampling circuit includes an isolation capacitor, a voltage divider, a unidirectional conductive element, a sampling capacitor and a discharge resistor. The isolation capacitor includes a first terminal and a second terminal, wherein the first terminal of the isolation capacitor is coupled to the resonant terminal of the resonant circuit. The voltage divider includes an input terminal and an output terminal, wherein the input terminal of the voltage divider is coupled to the second terminal of the isolation capacitor, and the output terminal of the voltage divider outputs a divided voltage, wherein the divided voltage is proportional to a voltage of the second terminal of the isolation capacitor. The unidirectional conductive element includes a first terminal and a second terminal, wherein the first terminal of the unidirectional conductive element receives the divided voltage. The sampling capacitor includes a first terminal and a second terminal, wherein the first terminal of the sampling capacitor is coupled to the second terminal of the unidirectional conductive element, and the second terminal of the sampling capacitor is coupled to the common voltage. The discharge resistor includes a first terminal and a second terminal, wherein the first terminal of the discharge resistor is coupled to the first terminal of the sampling capacitor, and the second terminal of the discharge resistor is coupled to the second terminal of the sampling capacitor.

In the wireless charging circuit and the abnormal state protection circuit according to the preferred embodiment of the present invention, the DC sampling circuit includes a unidirectional conductive element, a first resistor, a sampling capacitor and a second resistor. The unidirectional conductive element includes a first terminal and a second terminal, wherein the first terminal of the unidirectional conductive element is coupled to the resonant terminal of the resonant circuit. The first resistor includes a first terminal and a second terminal, wherein the first terminal of the first resistor is coupled to the second terminal of the unidirectional conductive element. The sampling capacitor includes a first terminal and a second terminal, wherein the first terminal of the sampling capacitor is coupled to the second terminal of the first resistor, and the second terminal of the sampling capacitor is coupled to the common voltage. The second resistor includes a first terminal and a second terminal, wherein the first terminal of the second resistor is coupled to first terminal of the sampling capacitor and the second terminal of the first resistor, and the second terminal of the second resistor is coupled to the second terminal of the sampling capacitor.

In the wireless charging circuit and the abnormal state protection circuit according to the preferred embodiment of the present invention, the DC sampling circuit includes a voltage divider, a unidirectional conductive element, a sampling capacitor and a discharge resistor. The voltage divider includes an input terminal and an output terminal, wherein the input terminal of the voltage divider is coupled to the resonant terminal of the resonant circuit, and the output terminal of the voltage divider outputs a divided voltage, wherein the divided voltage is proportional to a voltage of the resonant terminal of the resonant circuit. The unidirectional conductive element includes a first terminal and a second terminal, wherein the first terminal of the unidirectional conductive element receive the divided voltage. The sampling capacitor includes a first terminal and a second terminal, wherein the first terminal of the sampling capacitor is coupled to the second terminal of the unidirectional conductive element, and the second terminal of the sampling capacitor is coupled to the common voltage. The discharge resistor includes a first terminal and a second terminal, wherein the first terminal of the discharge resistor is coupled to the first terminal of the sampling capacitor, and the second terminal of the discharge resistor is coupled to the second terminal of the sampling capacitor.

In the wireless charging circuit and the abnormal state protection circuit according to the preferred embodiment of the present invention, the wireless charging circuit further includes a warning circuit. The warning circuit is coupled to the control circuit. When the DC voltage is greater than the threshold voltage, it means the abnormal state, and the control circuit controls the warning circuit to output a warning signal to notify a user. In a preferred embodiment, the warning circuit includes a light emitting diode. When the DC voltage is greater then the threshold voltage, the control circuit controls the light emitting diode to blink. When the DC voltage is smaller than the threshold voltage, the control circuit controls the light emitting diode to turn on and remain on.

The spirit of the present invention is to detect the DC component of the node voltage of the resonant node of the resonant circuit. When the DC component of the node voltage of the resonant node is greater than a threshold voltage, it is immediately determined that the abnormal state occurs. At this time, the protection mode is entered to limit the output power of the wireless charging circuit. Since the abnormal state occurrs, such as an abnormal item or a conductor being put between the wireless charging transmitter and the wireless charging receiver, or a coil offset, the wireless charging receiver would send a signal to notify an insufficient power to the wireless charging transmitter. It causes the wireless charging transmitter would keep increase the current flowing through the resonant coil. Therefore, it may causes the plastic case of the wireless charging transmitter to burn down, even breaking out of fire. In the present invention, when the abnormal state occurs, the protection mode is immediately entered to limit the current flowing through the resonant coil. Therefore, the hazardous situation is prevented.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
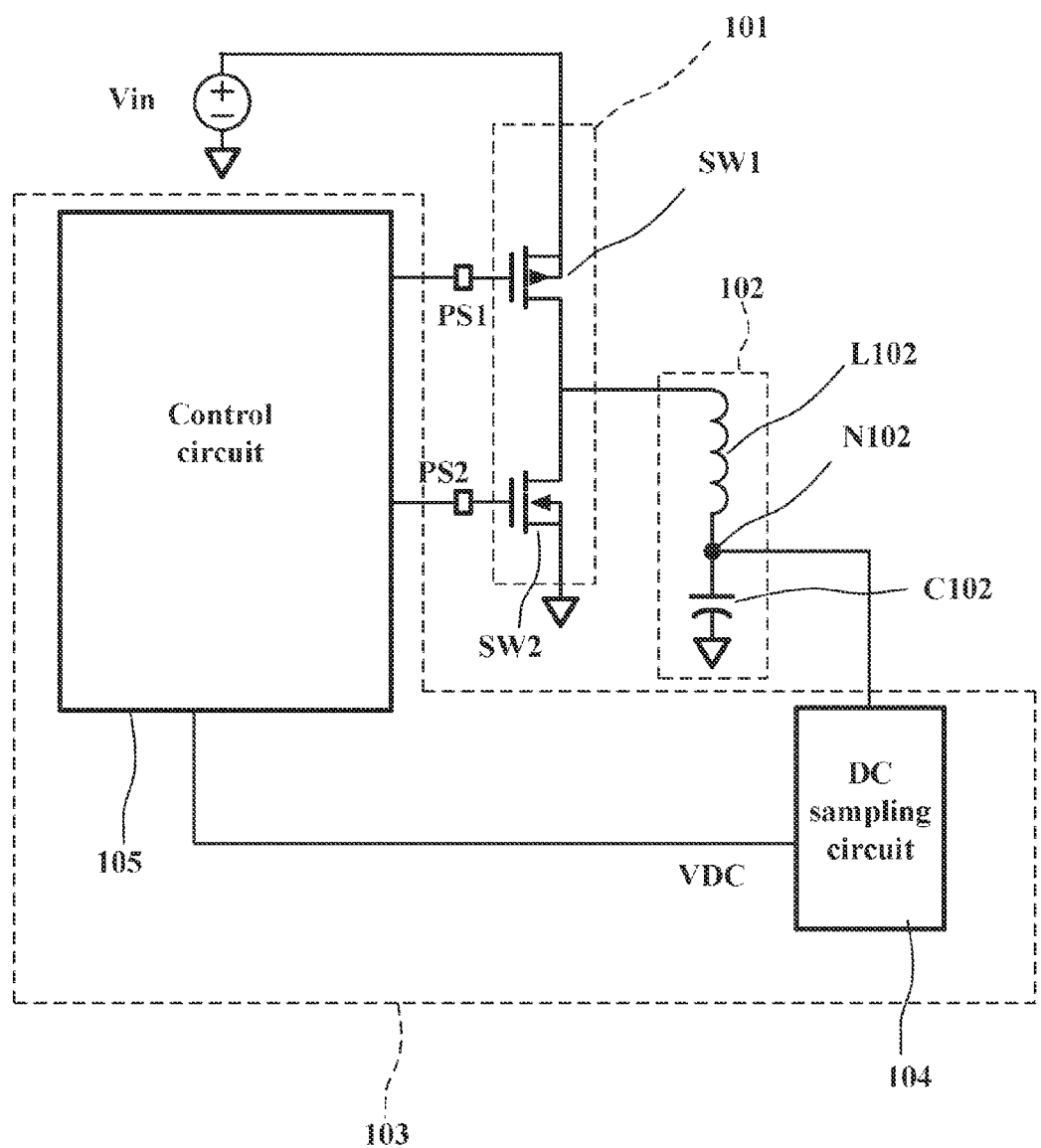
FIG. 1 illustrates a circuit diagram depicting a wireless charging circuit according to a preferred embodiment of the present invention.

FIG. 1 illustrates a circuit diagram depicting a wireless charging circuit according to a preferred embodiment of the present invention. Referring to FIG. 1, the wireless charging circuit includes a power converter 101, a resonant circuit 102 and an abnormal state protection circuit 103. In this embodiment, the power converter 101 is a half-bridge converter. The resonant circuit 102 includes a resonant coil L102 and a resonant capacitor C102. The abnormal state protection circuit 103 includes a DC sampling circuit 104 and a control circuit 105. The DC sampling circuit 104 is used for sampling the DC component of a voltage of the resonant terminal N102 coupled by the resonant coil L102 and the resonant capacitor C102 to obtain a DC voltage VDC. The control circuit 105 is coupled to the power converter 101 and the DC sampling circuit 104 to receive the DC voltage VDC.

When the wireless charging circuit is normally operated, which means the wireless power receiver, such as cellphone, is laid on the wireless charging circuit (operated as a wireless power transmitter), the wireless power receiver uses a preset communication protocol to require pairing to the wireless power transmitter and asking for charging. The wireless power transmitter would controls the power converter 101 to supply a pulse to the resonant circuit 102 to transmit an electromagnetic energy. However, when the position of the coil of the wireless power receiver and the position of the coil of the wireless power transmitter are not matched, or there is an conductor object between the coil of the wireless power receiver and the coil of the wireless power transmitter, the wireless power receiver may not completely receive the electromagnetic energy from the wireless power transmitter. At this time, the wireless power receiver would continuously ask the wireless power transmitter to provide more electromagnetic energy. The wireless power transmitter would control the power converter 101 to supply higher current to the resonant circuit 102 and the resonant circuit 102 may be operated at the frequency that is very close to the resonant frequency. Since the abovementioned situation occurs, the wireless power receiver may not completely receive the electromagnetic energy from the wireless power transmitter, and the wireless power receiver would continuously ask the wireless power transmitter to increase the emitting electromagnetic energy. Thus, the system would operate in positive feedback mode, and the wireless power transmitter would continuously operate at the resonant frequency and output a maximum energy. If this situation continues, the wireless charging circuit would overheat, and the plastic case may be melted. Furthermore, it may cause fire.

However, in the present embodiment of the present invention, the DC sampling circuit 104 would sample the DC component of the voltage of the resonant node N102 which is coupled to the resonant coil L102 and the resonant capacitor C102 to obtain the DC voltage VDC. When the DC voltage VDC is higher, the operating frequency of the wireless power transmitter is closer to the resonant frequency. It also means the current flowing through the resonant coil L102 is higher. The control circuit 105 receives the DC voltage VDC, and the control circuit 105 includes a threshold voltage. When the DC voltage is greater than the threshold voltage, it means an abnormal situation occurs, for example, the position of the coil of the wireless power receiver and the position of the coil of the wireless power transmitter are not matched, or there is an conductor object between the coil of the wireless power receiver and the coil of the wireless power transmitter. At this time, the control circuit 105 would control the wireless charging circuit to enter a protection mode to limit the current flowing through the resonant coil L102, such that the wireless charging circuit is prevented from overheating. In addition, in order to limit the current flowing through the resonant coil L102, one of implement examples of the control circuit 105 is to control the pulse width of the pulses PS1 and PS2 respectively supplying to the upper switch SW1 and the lower switch SW2.

Figure 2:
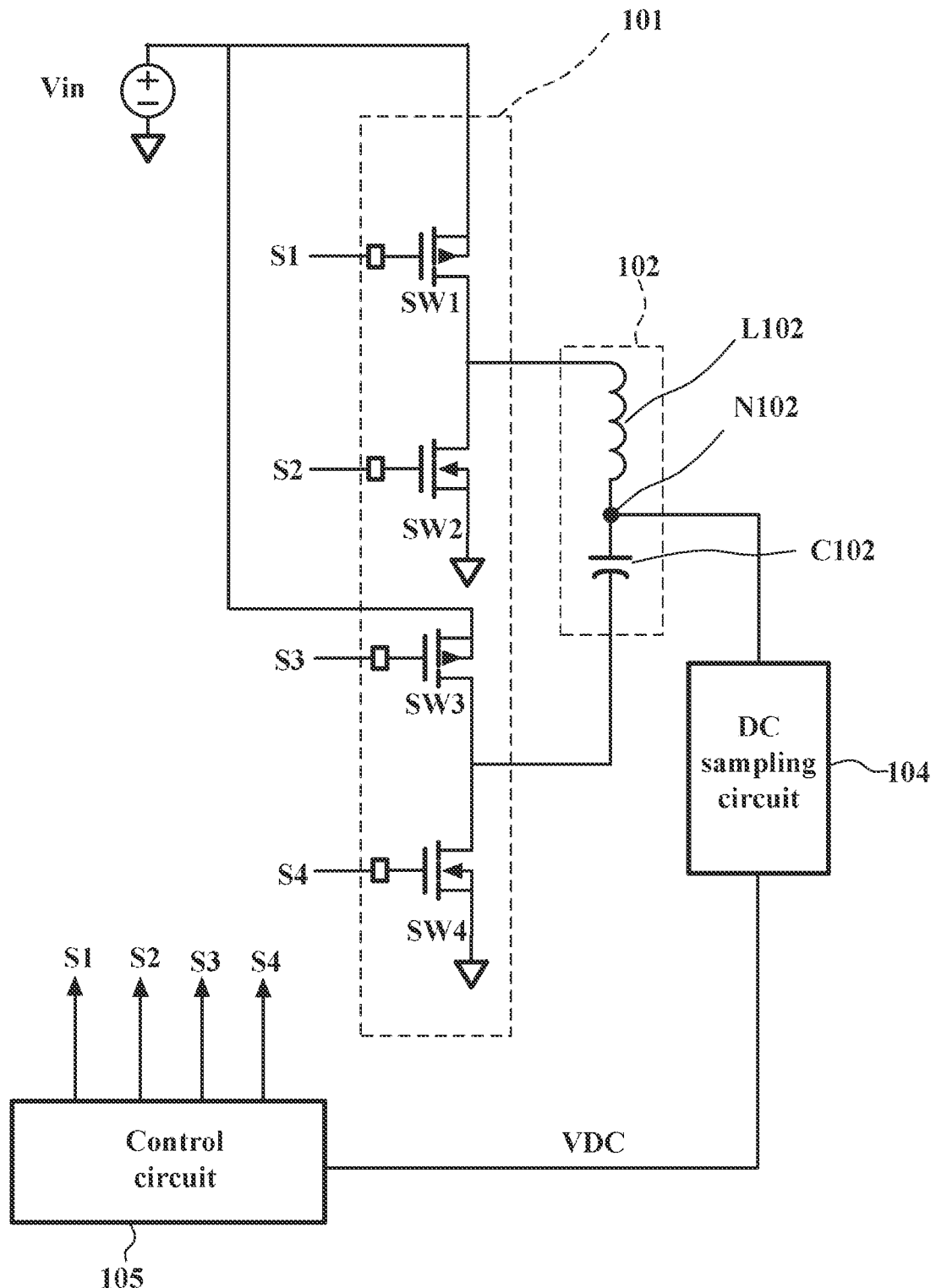
FIG. 2 illustrates a circuit diagram depicting a wireless charging circuit according to a preferred embodiment of the present invention.

FIG. 2 illustrates a circuit diagram depicting a wireless charging circuit according to a preferred embodiment of the present invention. Referring to FIG. 2, in this embodiment, the power converter 101 is implemented by a full bridge converter, which comprises four switches SW1, SW2, SW3 and SW4, wherein the switch control signal S1 for the switch SW1 and the switch control signal S4 for the switch SW4 are in phase, and the switch control signal S2 for the switch SW2 and the switch control signal S3 for the switch SW3 are in phase. Since the circuit operation in FIG. 2 is similar to the circuit operation in FIG. 1, the detail description is omitted.

Figure 3:
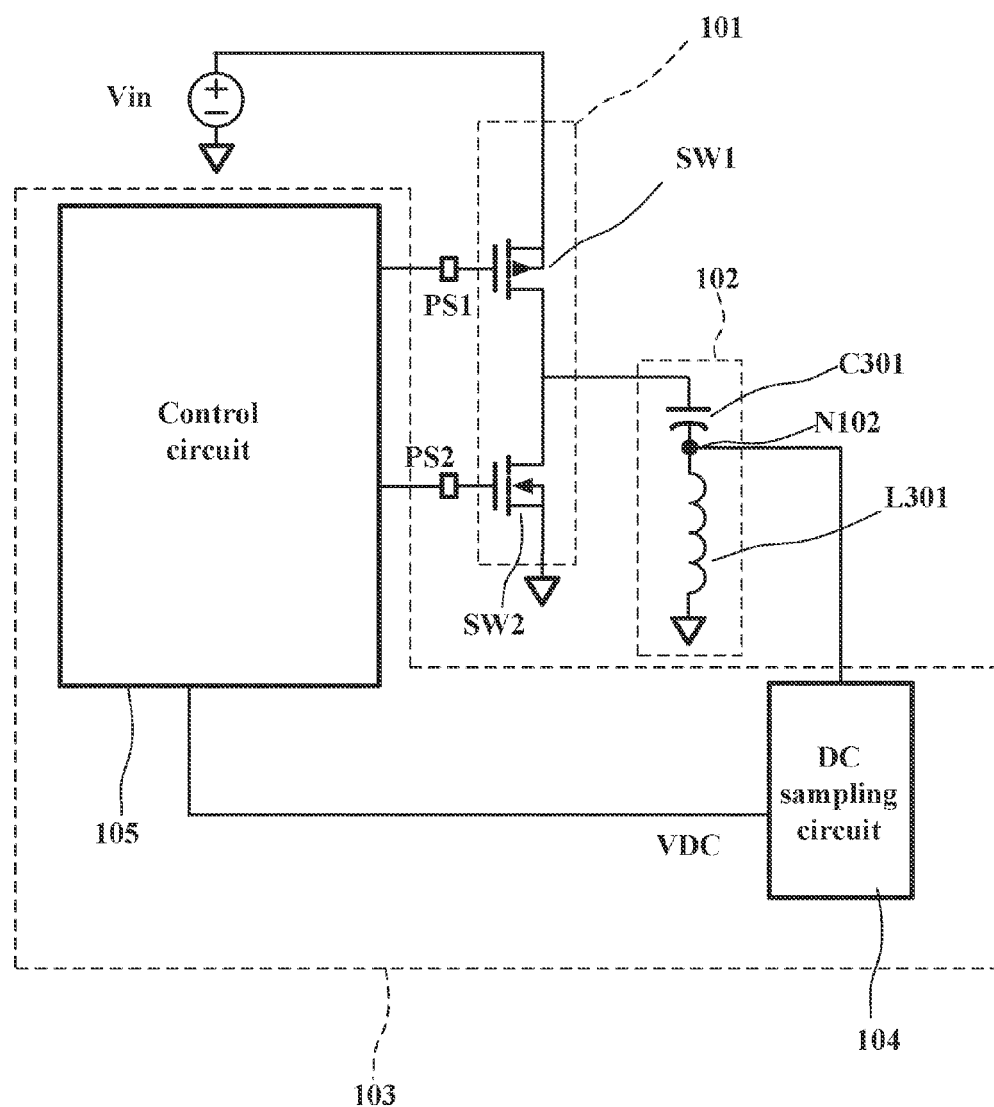
FIG. 3 illustrates a circuit diagram depicting a wireless charging circuit according to a preferred embodiment of the present invention.

FIG. 3 illustrates a circuit diagram depicting a wireless charging circuit according to a preferred embodiment of the present invention. Referring to FIG. 3, in this embodiment, the resonant circuit 102 also includes a resonant coil L301 and a resonant capacitor C301. However, the coupling relationship of the resonant circuit 102 is different from those of circuits in FIG. 1 and FIG. 2. Since the circuit operation in FIG. 3 is similar to the circuit operation in FIG. 1, the detail description is omitted.

Figure 4:
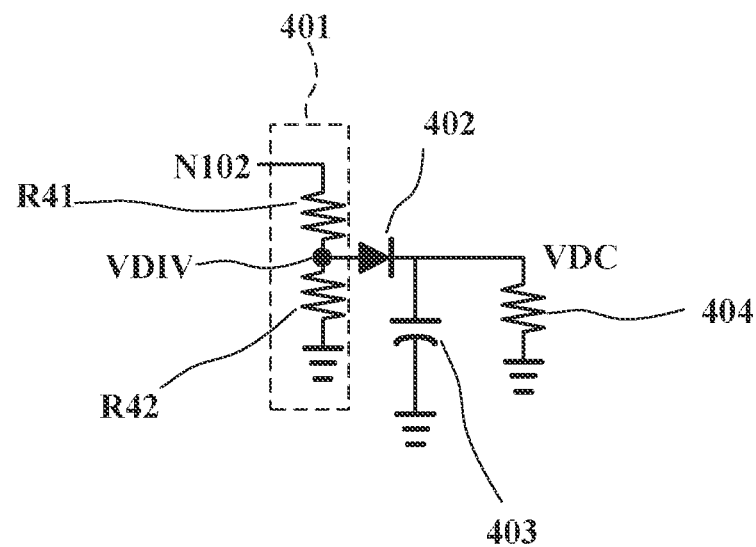
FIG. 4 illustrates a circuit diagram depicting the DC sampling circuit 104 of the wireless charging circuit according to a preferred embodiment of the present invention.

FIG. 4 illustrates a circuit diagram depicting the DC sampling circuit 104 of the wireless charging circuit according to a preferred embodiment of the present invention. Referring to FIG. 4, in this embodiment, the DC sampling circuit 104 is implemented by a voltage divider 41, a unidirectional conductive element 402, a sampling capacitor 403 and a discharge resistor 404. The voltage divider 401 is implemented by two resistors R41 and R42 for dividing the voltage of node N102 to obtain a divided voltage VDIV. The unidirectional conductive element 402 is used for rectifying the divided voltage VDIV. The sampling capacitor 403 is used for performing a DC filter to the rectified divided voltage VDIV. The discharge resistor 404, the unidirectional conductive element 402 and the sampling capacitor 403 compose the quasi-peak detector to obtain the DC voltage. In this embodiment, the unidirectional conductive element 402 is implemented by a diode. However, people having ordinary skill in the art should know that the transistor or other semiconductor also can be used to implement the unidirectional conductive element 402. Thus, the present invention is not limited thereto. Likewise, in the following embodiments, the description of implementation of the unidirectional conductive element is omitted.

Figure 5:
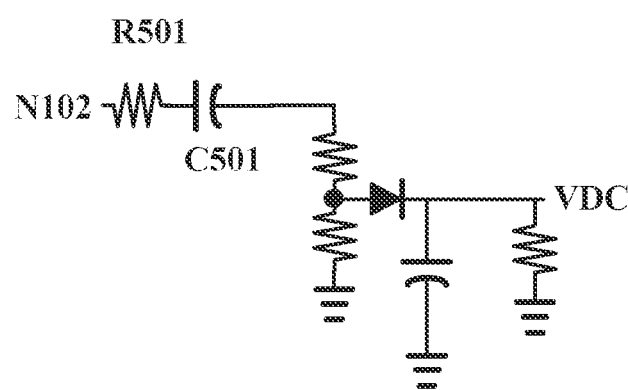
FIG. 5 illustrates a circuit diagram depicting the DC sampling circuit 104 of the wireless charging circuit according to a preferred embodiment of the present invention.

FIG. 5 illustrates a circuit diagram depicting the DC sampling circuit 104 of the wireless charging circuit according to a preferred embodiment of the present invention. Referring to FIG. 4 and FIG. 5, comparing with the DC sampling circuit 104 in FIG. 4, the DC sampling circuit 104 in FIG. 5 further includes an isolation capacitor C501 and a current limiting resistor R501. The current limiting resistor R501 is mainly used for limiting the current flowing through the DC sampling circuit 104. The current limiting resistor R501 can be replaced by the resistor(s) in voltage divider 402. It means the current limiting resistor R501 is an inessential element or an optional element. Similarly, the isolation capacitor C501 is used for isolating the DC component of the voltage of node N102. Likewise, the isolation capacitor C501 is an inessential element or an optional element. Since the circuit operation in FIG. 5 is similar to the circuit operation in FIG. 4, the detail description is omitted.

Figure 6:
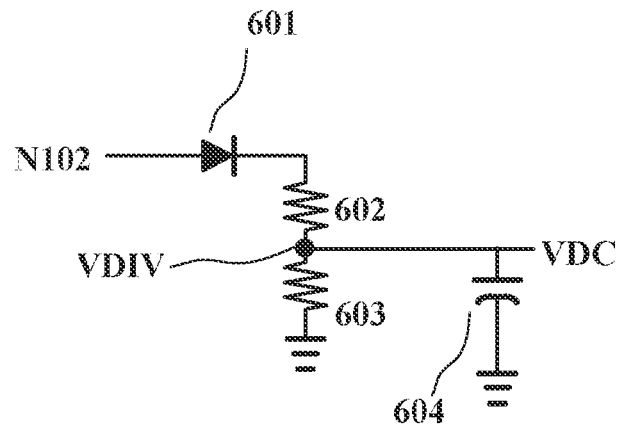
FIG. 6 illustrates a circuit diagram depicting the DC sampling circuit 104 of the wireless charging circuit according to a preferred embodiment of the present invention.

FIG. 6 illustrates a circuit diagram depicting the DC sampling circuit 104 of the wireless charging circuit according to a preferred embodiment of the present invention. Referring to FIG. 6, in this embodiment, the DC sampling circuit 104 is implemented by a unidirectional conductive element 601, a first resistor 602, a second resistor 603 and a sampling capacitor 604. The unidirectional conductive element 601 is used for rectifying the voltage of the node N102. The first resistor 602 and the second resistor 603 compose a voltage divider for dividing the voltage of the anode of the unidirectional conductive element 601 to obtain a divided voltage VDIV. The sampling capacitor 604 is used for performing a DC filter to the divided voltage VDIV. The second resistor 603, the unidirectional conductive element 601 and the sampling capacitor 604 compose a quasi-peak detector to obtain the DC voltage.

Figure 7:
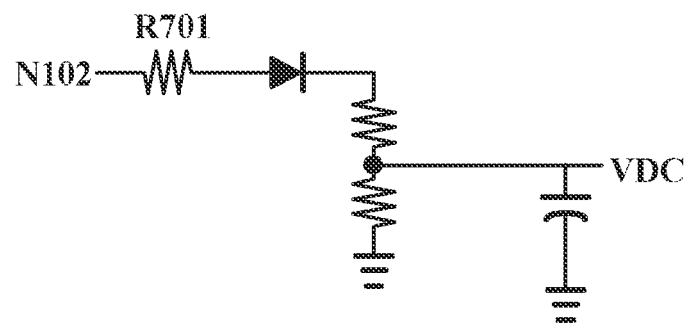
FIG. 7 illustrates a circuit diagram depicting the DC sampling circuit 104 of the wireless charging circuit according to a preferred embodiment of the present invention.

FIG. 7 illustrates a circuit diagram depicting the DC sampling circuit 104 of the wireless charging circuit according to a preferred embodiment of the present invention. Referring to FIG. 6 and FIG. 7, comparing with the DC sampling circuit in FIG. 6, the DC sampling circuit 104 in FIG. 7 further includes a current limiting resistor R701. The current limiting resistor R701 is used for limiting the current flowing through the DC sampling circuit 104. The current limiting resistor R701 can be replaced by the first resistor 602 and the second resistor 603. It means the current limiting resistor R701 is an inessential element or an optional element. Since the circuit operation in FIG. 7 is similar to the circuit operation in FIG. 6, the detail description is omitted.

Figure 8:
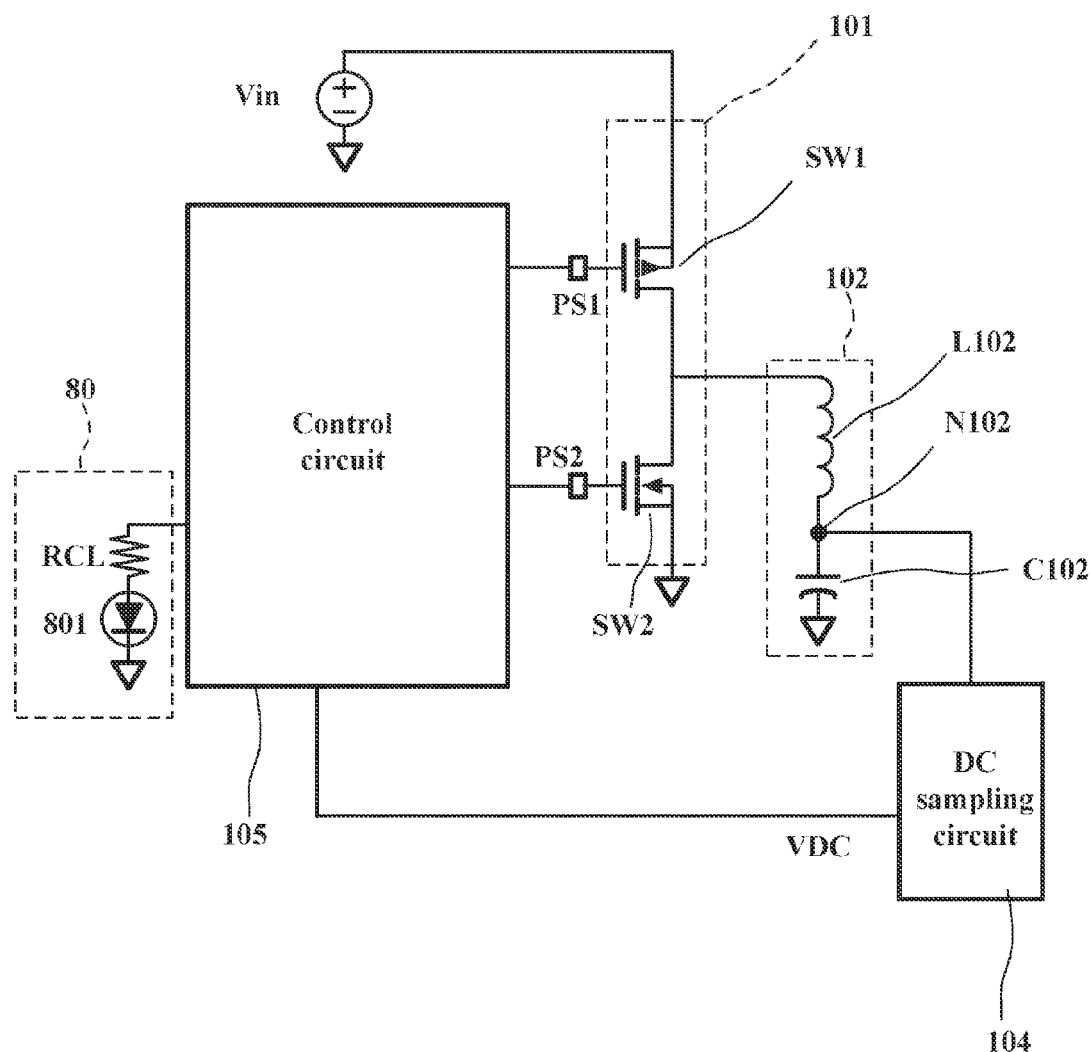
FIG. 8 illustrates a circuit diagram depicting a wireless charging circuit according to a preferred embodiment of the present invention.

FIG. 8 illustrates a circuit diagram depicting a wireless charging circuit according to a preferred embodiment of the present invention. Referring to FIG. 1 and FIG. 8, comparing with the wireless charging circuit in FIG. 1, the wireless charging circuit in FIG. 8 further includes a warning circuit 80, wherein the warning circuit 80 is implemented by a light emitting diode 801 and a current limiting resistor RCL. When the abnormal situation occurs, the DC voltage VDC would be greater than the threshold voltage of the control circuit 105. At this time, the control circuit not only limits the current flowing through the resonant circuit 102, but also notifys user of this abnormal situation through the warning circuit 80. In this embodiment, when the wireless charging circuit operates normally, the light emitting diode 801 for example remains on-state; when the abnormal situation occurs, the light emitting diode 801 starts blinking. When user notices that the light emitting diode 801 was blinking, user can immediately adjust the disposed position of the mobile device or check whether there is an object between the wireless charging device and mobile device.

In summary, the spirit of the present invention is to detect the DC component of the node voltage of the resonant node of the resonant circuit. When the DC component of the node voltage of the resonant node is greater than a threshold voltage, it is immediately determined that the abnormal state occurs. At this time, the protection mode is entered to limit the output power of the wireless charging circuit. Since the abnormal state occurs, such as an abnormal item or a conductor being put between the wireless charging transmitter and the wireless charging receiver or an coil offset, the wireless charging receiver would send a signal to notify an insufficient power to the wireless charging transmitter. It causes the wireless charging transmitter would keep increase the current to be input to the resonant coil. Therefore, it may result that the plastic case of the wireless charging transmitter is burnt down, even breaking out of fire. In the present invention, when the abnormal state occurs, the protection mode is immediately entered to limit the current flowing through the resonant coil. Therefore, the hazardous situation is prevented.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A wireless charging circuit, comprising:
    a power converter, receiving an input voltage, for outputting a pulse width modulation signal;
    a resonant circuit, comprising an input terminal, a resonant terminal and a common voltage terminal, wherein the input terminal of the resonant circuit receives the pulse width modulation signal, and the common voltage terminal of the resonant circuit is coupled to a common voltage;
    an abnormal state protection circuit, comprising:
        a DC sampling circuit, coupled to the resonant terminal of the resonant circuit, for sampling a DC component of a voltage of the resonant terminal of the resonant circuit to obtain a DC voltage; and
        a control circuit, coupled to the power converter and the DC sampling circuit, receiving the DC voltage,
    wherein the control circuit controls the power converter to reduce a current inputted to the resonant circuit when the DC voltage is greater than a threshold voltage.

2. The wireless charging circuit according to claim 1, wherein the resonant circuit comprises:
    a resonant coil, comprising a first terminal and a second terminal, wherein the first terminal of the resonant coil is coupled to the input terminal of the resonant circuit; and
    a resonant capacitor, comprising a first terminal and a second terminal, wherein the first terminal of the resonant capacitor is coupled to the second terminal of the resonant coil and the resonant terminal of the resonant circuit, and the second terminal of the resonant capacitor is coupled to the common voltage terminal of the resonant circuit.

3. The wireless charging circuit according to claim 1, wherein the DC sampling circuit comprises:
    an isolation capacitor, comprising a first terminal and a second terminal, wherein the first terminal of the isolation capacitor is coupled to the resonant terminal of the resonant circuit;
    a voltage divider, comprising an input terminal and an output terminal, wherein the input terminal of the voltage divider is coupled to the second terminal of the isolation capacitor, and the output terminal of the voltage divider outputs a divided voltage, wherein the divided voltage is proportional to a voltage of the second terminal of the isolation capacitor;
    a unidirectional conductive element, comprising a first terminal and a second terminal, wherein the first terminal of the unidirectional conductive element receives the divided voltage;
    a sampling capacitor, comprising a first terminal and a second terminal, wherein the first terminal of the sampling capacitor is coupled to the second terminal of the unidirectional conductive element, and the second terminal of the sampling capacitor is coupled to the common voltage; and
    a discharge resistor, comprising a first terminal and a second terminal, wherein the first terminal of the discharge resistor is coupled to the first terminal of the sampling capacitor, and the second terminal of the discharge resistor is coupled to the second terminal of the sampling capacitor.

4. The wireless charging circuit according to claim 3, wherein the DC sampling circuit further comprises:
    a current limiting resistor, coupled between the resonant terminal of the resonant circuit and the first terminal of the isolation capacitor.

5. The wireless charging circuit according to claim 1, wherein the DC sampling circuit comprises:
    a unidirectional conductive element, comprising a first terminal and a second terminal, wherein the first terminal of the unidirectional conductive element is coupled to the resonant terminal of the resonant circuit;
    a first resistor, comprising a first terminal and a second terminal, wherein the first terminal of the first resistor is coupled to the second terminal of the unidirectional conductive element;
    a sampling capacitor, comprising a first terminal and a second terminal, wherein the first terminal of the sampling capacitor is coupled to the second terminal of the first resistor, and the second terminal of the sampling capacitor is coupled to the common voltage; and
    a second resistor, comprising a first terminal and a second terminal, wherein the first terminal of the second resistor is coupled to first terminal of the sampling capacitor and the second terminal of the first resistor, and the second terminal of the second resistor is coupled to the second terminal of the sampling capacitor.

6. The wireless charging circuit according to claim 5, wherein the DC sampling circuit further comprises:
    a current limiting resistor, coupled between the resonant terminal of the resonant circuit and the first terminal of the unidirectional conductive element.

7. The wireless charging circuit according to claim 1, wherein the DC sampling circuit comprises:
   a voltage divider, comprising an input terminal and an output terminal, wherein the input terminal of the voltage divider is coupled to the resonant terminal of the resonant circuit, and the output terminal of the voltage divider outputs a divided voltage, wherein the divided voltage is proportional to the voltage of the resonant terminal of the resonant circuit;
   a unidirectional conductive element, comprising a first terminal and a second terminal, wherein the first terminal of the unidirectional conductive element receive the divided voltage;
   a sampling capacitor, comprising a first terminal and a second terminal, wherein the first terminal of the sampling capacitor is coupled to the second terminal of the unidirectional conductive element, and the second terminal of the sampling capacitor is coupled to the common voltage; and
   a discharge resistor, comprising a first terminal and a second terminal, wherein the first terminal of the discharge resistor is coupled to the first terminal of the sampling capacitor, and the second terminal of the discharge resistor is coupled to the second terminal of the sampling capacitor.

8. The wireless charging circuit according to claim 1, further comprising:
   a warning circuit, coupled to the control circuit, wherein the control circuit controls the warning circuit to output a warning signal to notify a user when the DC voltage is greater than the threshold voltage.

9. The wireless charging circuit according to claim 8, wherein the warning circuit comprises:
   a light emitting diode, wherein the control circuit controls the light emitting diode to blink when the DC voltage is greater then the threshold voltage.

10. A abnormal state protection circuit, adapted for a wireless charging circuit, wherein the wireless charging circuit comprises a power converter and a resonant circuit, wherein the power converter receives an input voltage for outputting a pulse width modulation signal, wherein the resonant circuit comprises an input terminal, a resonant terminal and a common voltage terminal, wherein the input terminal receives the pulse width modulation signal, the common voltage terminal is coupled to a common voltage, wherein the abnormal state protection circuit comprises:
   a DC sampling circuit, coupled to the resonant terminal of the resonant circuit for sampling a DC component of a voltage of the resonant terminal of the resonant circuit to obtain a DC voltage; and
   a control circuit, coupled to the power converter and the DC sampling circuit, receiving the DC voltage,
   wherein the control circuit control the power converter to reduce a current inputted to the resonant circuit when the DC voltage is greater than a threshold voltage.

11. The abnormal state protection circuit according to claim 10, wherein the resonant circuit comprises:
   a resonant coil, comprising a first terminal and a second terminal, wherein the first terminal of the resonant coil is coupled to the input terminal of the resonant circuit; and
   a resonant capacitor, comprising a first terminal and a second terminal, wherein the first terminal of the resonant capacitor is coupled to the second terminal of the resonant coil and the resonant terminal of the resonant circuit, and the second terminal of the resonant capacitor is coupled to the common voltage terminal of the resonant circuit.

12. The abnormal state protection circuit according to claim 10, wherein the DC sampling circuit comprises:
   an isolation capacitor, comprising a first terminal and a second terminal, wherein the first terminal of the isolation capacitor is coupled to the resonant terminal of the resonant circuit;
   a voltage divider, comprising an input terminal and an output terminal, wherein the input terminal of the voltage divider is coupled to the second terminal of the isolation capacitor, and the output terminal of the voltage divider outputs a divided voltage, wherein the divided voltage is proportional to a voltage of the second terminal of the isolation capacitor;
   a unidirectional conductive element, comprising a first terminal and a second terminal, wherein the first terminal of the unidirectional conductive element receives the divided voltage;
   a sampling capacitor, comprising a first terminal and a second terminal, wherein the first terminal of the sampling capacitor is coupled to the second terminal of the unidirectional conductive element, and the second terminal of the sampling capacitor is coupled to the common voltage; and
   a discharge resistor, comprising a first terminal and a second terminal, wherein the first terminal of the discharge resistor is coupled to the first terminal of the sampling capacitor, and the second terminal of the discharge resistor is coupled to the second terminal of the sampling capacitor.

13. The abnormal state protection circuit according to claim 12, wherein the DC sampling circuit further comprises:
   a current limiting resistor, coupled between the resonant terminal of the resonant circuit and the first terminal of the isolation capacitor.

14. The abnormal state protection circuit according to claim 10, wherein the DC sampling circuit comprises:
   a unidirectional conductive element, comprising a first terminal and a second terminal, wherein the first terminal of the unidirectional conductive element is coupled to the resonant terminal of the resonant circuit;
   a first resistor, comprising a first terminal and a second terminal, wherein the first terminal of the first resistor is coupled to the second terminal of the unidirectional conductive element;
   a sampling capacitor, comprising a first terminal and a second terminal, wherein the first terminal of the sampling capacitor is coupled to the second terminal of the first resistor, and the second terminal of the sampling capacitor is coupled to the common voltage; and
   a second resistor, comprising a first terminal and a second terminal, wherein the first terminal of the second resistor is coupled to first terminal of the sampling capacitor and the second terminal of the first resistor, and the second terminal of the second resistor is coupled to the second terminal of the sampling capacitor.

15. The abnormal state protection circuit according to claim 14, wherein the DC sampling circuit further comprises:
   a current limiting resistor, coupled between the resonant terminal of the resonant circuit and the first terminal of the unidirectional conductive element.

16. The abnormal state protection circuit according to claim 10, wherein the DC sampling circuit comprises:
   a voltage divider, comprising an input terminal and an output terminal, wherein the input terminal of the voltage divider is coupled to the resonant terminal of the resonant circuit, and the output terminal of the voltage divider outputs a divided voltage, wherein the divided voltage is proportional to a voltage of the resonant terminal of the resonant circuit;

a unidirectional conductive element, comprising a first terminal and a second terminal, wherein the first terminal of the unidirectional conductive element receive the divided voltage;

a sampling capacitor, comprising a first terminal and a second terminal, wherein the first terminal of the sampling capacitor is coupled to the second terminal of the unidirectional conductive element, and the second terminal of the sampling capacitor is coupled to the common voltage; and a discharge resistor, comprising a first terminal and a second terminal, wherein the first terminal of the discharge resistor is coupled to the first terminal of the sampling capacitor, and the second terminal of the discharge resistor is coupled to the second terminal of the sampling capacitor.

17. The abnormal state protection circuit according to claim 10, further comprising:

a warning circuit, coupled to the control circuit, wherein the control circuit controls the warning circuit to output a warning signal to notify a user when the DC voltage is greater than the threshold voltage.

18. The abnormal state protection circuit according to claim 17, wherein the warning circuit comprises:

a light emitting diode, wherein the control circuit controls the light emitting diode to blink when the DC voltage is greater then the threshold voltage.

* * * * *